INVENTOR
A. L. HOPPER
BY Hugh S. Wertz
ATTORNEY

INVENTOR
A. L. HOPPER
BY Hugh S. Wertz
ATTORNEY

Feb. 1, 1955 A. L. HOPPER 2,701,305

RECOGNITION CIRCUIT

Filed Sept. 15, 1951 4 Sheets-Sheet 3

INVENTOR
A. L. HOPPER
BY Hugh S. Wertz
ATTORNEY

INVENTOR
A. L. HOPPER
BY Hugh S. Wertz
ATTORNEY

United States Patent Office 2,701,305

Patented Feb. 1, 1955

2,701,305

RECOGNITION CIRCUIT

Andrew L. Hopper, Summit, N. J., assignor to Bell Telephone Laboratories, Incorporated, New York, N. Y., a corporation of New York Application September 15, 1951, Serial No. 246,842

7 Claims. (Cl. 250—27)

This invention relates to time division multiplex transmission systems and more particularly to recognition circuits for time division multiplex systems which employ an interpulse timing code.

By way of example, for purposes of illustration, the invention will be described with particular reference to a time division multiplex system of elastic channel capacity of the kind described in a copending application of J. R. Pierce, Serial No. 160,113 filed May 5, 1950. In this system the message originating at each transmitter is sampled at a sequence of randomly recurring instants under control of a source of erratically timed pulses, e. g. a noise source. In operation, signal samples from various transmitting stations are interleaved in a random manner to form a multiplex pulse train which is transmitted over a common medium to various receivers. The operation is such that even though many transmitters are operating simultaneously there are always randomly located intervals in the pulse train in which some of the randomly timed pulses of a new transmitter may be inserted. As a result, the system is indefinitely elastic in its capacity. For the allocation of each of the various channels on the common transmitting medium to its appropriate receiver, at each transmitting terminal pulses intended for a particular receiver channel are formed into pulse groups of a preassigned number of pulses, spaced apart by preassigned time intervals, and with a preassigned amplitude and polarity distribution among them. Then, at the receiving terminal there is provided recognition apparatus for restricting acceptance by each receiver of only its appropriate pulse groups.

The principal object of the present invention is to provide improved recognition apparatus for such use. In partcular, there is desired apparatus which provides a true and definite indication of appropriate pulse groups despite interference effects between different pulse groups.

To this end, at each receiver the pulse train which comprises the various coded pulse groups is applied to a delay line along which are disposed a plurality of taps spaced apart characteristically in accordance with the particular interpulse timing code associated with that channel. The voltages at the various taps are compared by differential type bridges and when a preassigned relationship exists at particular points in the various bridges there is derived a gating control pulse which enables an otherwise blocked gating circuit and thus permits acceptance of an appropriate pulse group for utilization by the receiver. In a preferred embodiment, each pulse group comprises a pair of equal and opposite pulses separated by a characteristic interpulse interval, each pulse pair being representative of a single message sample. At the appropriate receiver, the pulse train which includes a plurality of different pulse groups randomly interleaved is applied to a delay line along which are spaced in sequence first, second, third, and fourth taps, the spacing between the first and the third and that between the second and the fourth taps corresponding to the preassigned time interval characteristic of that channel. Thereafter, by suitable bridging elements, there are derived the average potentials between the first and third taps, the first and fourth taps, the second and fourth taps, and the second and third taps. When each of these average potentials is zero, there is provided an enabling pulse which unblocks a gating circuit and permits acceptance by the receiver of the pulse pair critically located along the delay line. Successive appropriate pulse pairs are derived in the same manner, and the various message samples derived are combined to produce a facsimile of the original message wave intended for that receiver.

The invention will be better understood from the following detailed description taken in conjunction with the following drawings, in which:

Figs. 1 and 2 show, in block form and as a circuit, respectively, a transmitting terminal substantially of the kind described in the aforementioned copending Pierce application for providing pulse pairs coded by interpulse timing;

Figs. 3 and 4 correspondingly show a receiving terminal suitable for use with the transmitting terminal shown in Figs. 1 and 2;

Figure 1:
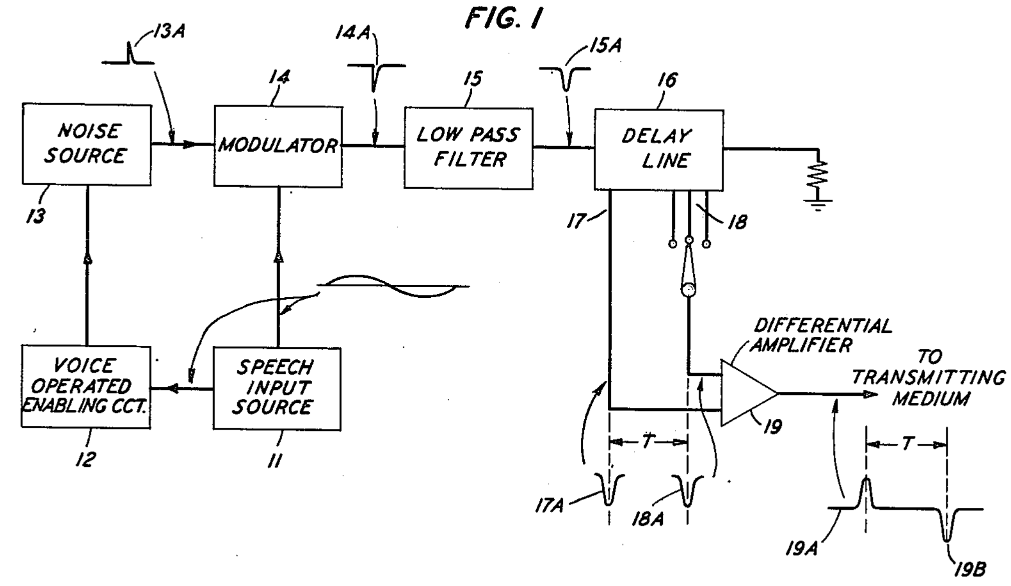

With more particular reference to the drawings, Fig. 1 shows schematically a typical transmitting terminal designed for speech inputs for providing coded pulse groups of the kind to which the recognition apparatus of the present invention is primarily directed. Speech energizes a signal source 11 which actuates a relay in the voice-operated enabling circuit 12. In this way, by talk spurts there is energized the noise source 13 which then provides erratically timed impulses 13A which are applied to the modulator 14 for modulation by the speech input. The voice modulated erratically timed pulses 14A are applied to a low pass filter for pulse shaping and then the output pulses 15A are applied to the input end of delay line 16. From taps 17 and 18 spaced along the delay line in accordance with the desired interpulse time code T, for each input pulse there can thereafter be derived two pulses 17A and 18A, of like polarity and appropriately spaced in time. These pulses are then applied to a differential amplifier 19 which inverts one with respect to the other and makes available the pulse pair 19A, 19B, the two pulses of the pair being equal and opposite and spaced apart in time by the code interpulse interval T. This coded pulse pair is then applied to the common transmitting medium for transmission to a particular receiver adapted for this particular code.

In a multiplex system, each one of various transmitting terminals of the type just described provides pulse pairs of a different interpulse timing code to the common transmitting medium for transmission to a particular receiving terminal and there results a pulse train which comprises a plurality of pulse groups randomly interleaved.

Figures 2, 4:
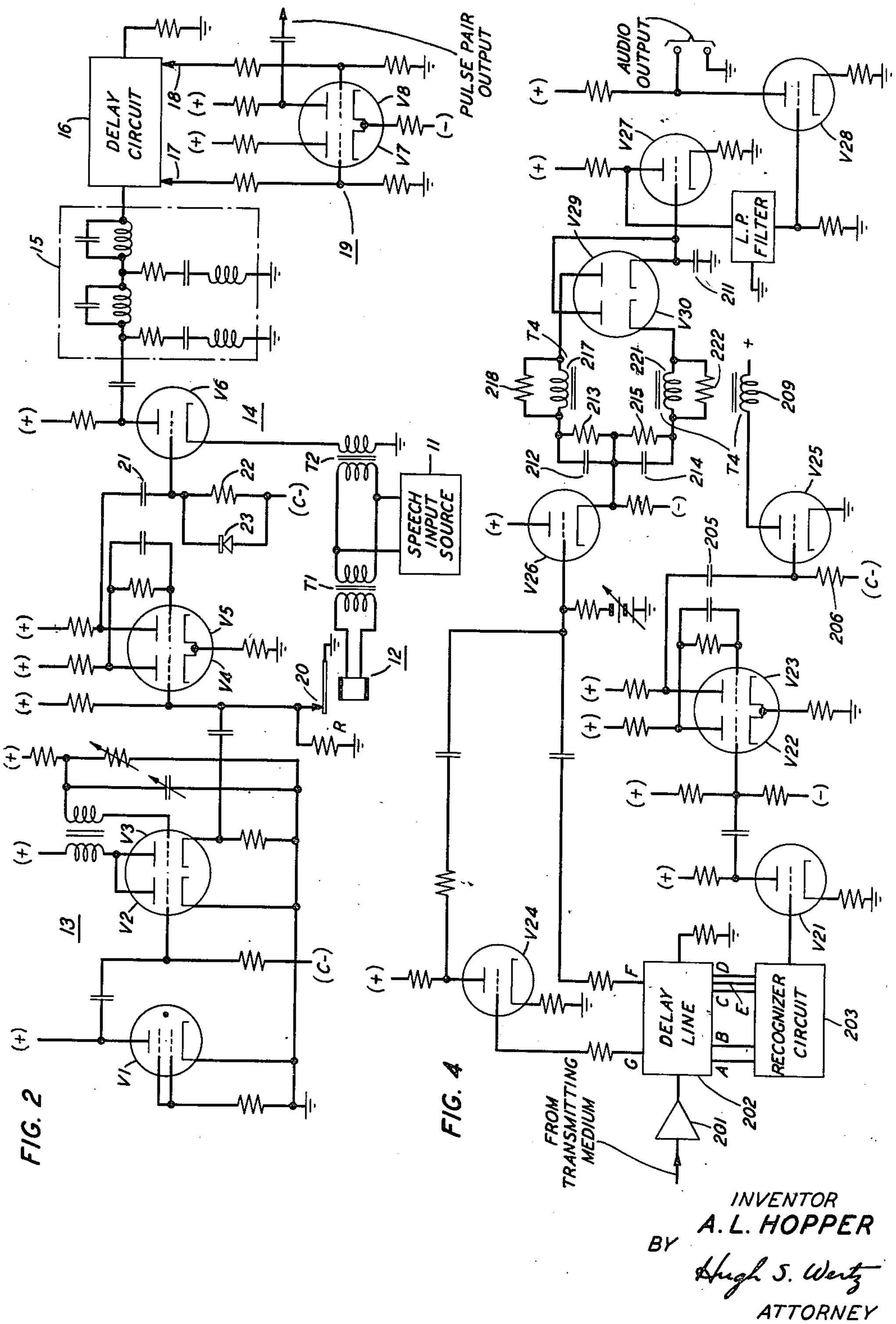

For purposes of illustration a typical transmitting terminal of the kind shown in block form in Fig. 1 is shown more diagrammatically in Fig. 2. A gas discharge tube V1 is operated as a noise generator to trigger at a random rate a conventional blocking oscillator comprising tubes V2 and V3 and their associated circuitry. Since the output amplitude of the blocking oscillator varies considerably with the repetition rate, to secure random pulses of constant amplitude the blocking oscillator output available at the cathode of tube V3 is applied to a conventional single shot multivibrator made up of tubes V4 and V5 and their associated circuitry. This single shot multivibrator is to be active only during talk spurts for maximum efficiency. To this end, the speech input energizes by way of transformer T1 the coil of relay R and opens the contact whereby the bias of tube V4 is brought to a value suitable for multivibrator operation. The output of the multivibrator is then differentiated by the differentiating circuit made up of the capacitance 21 and resistance 22 and clipped by the action of the unilaterally conducting element 23 which is poled to shunt pulses of a negative polarity. The erratically timed positive pulses of constant amplitude which are thus derived are then applied to the control grid of the modulator tube V6 to whose cathode is simultaneously applied the speech input by way of the transformer T2. Tube V6 is biased past cutoff for the quiescent condition of the multivibrator but conducts during the intervals when the erratically timed pulses are being applied to its control grid. As a result, there results at the plate of modulator V6 a train of samples of the speech input. If the sampling rate, i. e. the repetition rate of the erratically timed samples, is made at least twice the bandwidth of the speech input, there can be reconstructed from these samples a facsimile of the speech wave without loss of intelligence.

It is desirable that the pulses delivered to the common medium for transmission be approximately Gaussian in shape to minimize the possibility of interference with pulses from other transmitters. To this end the signal samples are applied to the low pass filter 15 which serves to shape the pulses as desired. Then the samples are applied to the delay line 16, which, for example, can be a continuously wound solenoid with taps for the connection of capacitors the whole forming a low pass filter having a phase characteristic linearly related to frequency and terminated to avoid reflections. The delay line is provided with two taps 17 and 18, spaced apart in accordance with the interpulse timing code characteristic of this particular transmission channel.

There will then be derived at these taps two substantially identical pulses which are separated by the code time interval. Each of these pulses is then applied to a different control grid of the two tubes V7 and V8, which together form the differential amplifier 19 which acts to combine the two pulses in opposite polarity while maintaining the proper coding interval. Accordingly, there will be derived at the output of tube V8 in response to each sample applied to the delay line, a pulse group comprising a pair of equal and opposite pulses, separated by a preset coding interval. These pulse groups are then applied to a suitable medium for transmission to the appropriate receiver.

As will become more evident later, the recognition circuit at the receiving terminal can be adapted to recognize more elaborate pulse groups. For example, it is unnecessary that in pulse groups of pulse pairs that the two elemental pulses be equal and opposite as described above, but pulse pairs of this kind are to be preferred since they do result in maximum simplicity of the recognition circuitry. Similarly, pulse groups of three or more pulses may be employed in which each elemental pulse of the group represents a different message sample, the intelligence then being impressed by frequency modulation of each elemental pulse rather than by amplitude modulation as described above. In this case, the code is provided by maintaining characteristic interpulse spacings between the elements of the group and preassigned amplitude and polarity relationships. A detailed description of a system which uses ternary pulse groups in this way can be found in the above-described copending Pierce application. It will be seen more clearly below however that the principles of the present invention are similarly applicable to these various other codes.

Figure 3:
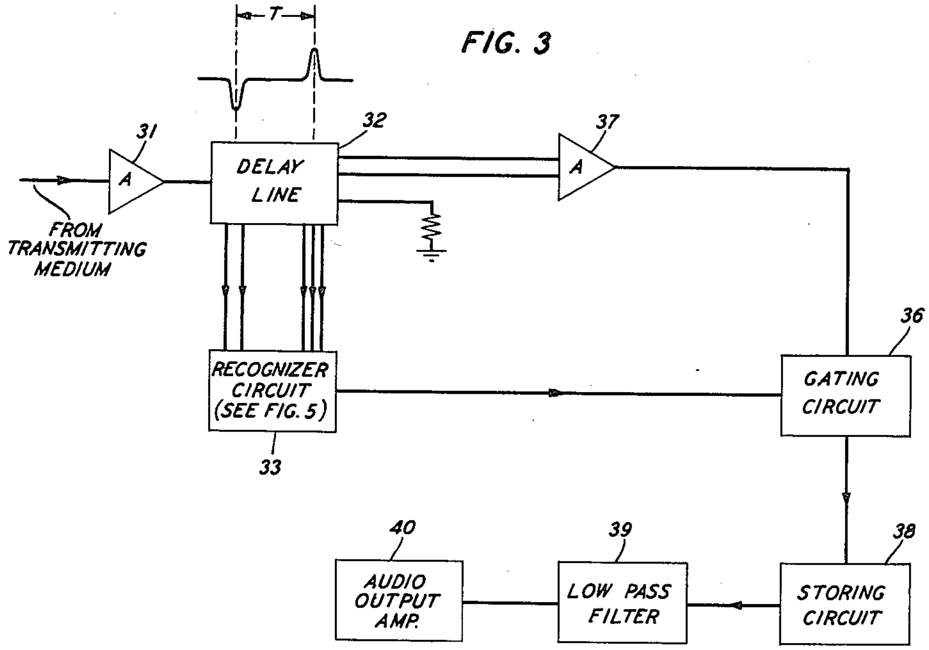

Fig. 3 shows schematically a receiver of the kind suitable for selecting from the pulse train in the transmitting medium appropriate pulse groups of pulse pairs of the kind provided by the transmitter just described. The incoming pulse train is first supplied to an amplifier 31 which serves the dual purpose of amplifying the signal level and also of isolating the transmitting medium from the receiver for minimizing reflection effects. The amplified pulse train is then applied as an input to a delay line 32, which preferably is similar to that being utilized at the transmitter in the coding operation. A recognizer circuit 33, which is the principal feature of the present invention and which will be described in greater detail below, continuously monitors the pulse train in its travel down the delay line at five taps therealong. When particular relationships are satisfied at these various taps, there is provided as an output from the recognizer circuit a control pulse which enables a gating circuit 36 and permits acceptance thereby of a pulse simultaneously being applied as an input thereto. This latter pulse is formed by combining the outputs derived at two other taps along the delay line, spaced apart therealong with respect to the taps supplying the recognizer circuit a distance compensating for the delay introduced by the recognizer circuit. This pulse is then applied to a storing circuit 38 which integrates the discrete pulses supplied thereto and provides a continuous signal output which is substantially a facsimile of the original speech input wave. This signal is then applied by way of a low pass filter 39 designed to eliminate the sampling frequencies to an audio output amplifier 40 which raises the signal to a level suitable for utilization.

Before describing in detail a particular circuit embodiment of a receiver of the kind just described schematically, it will be useful to analyze the operation of the recognizer circuit which features the present invention. The basic problem is to enable an otherwise blocked gating circuit each time an appropriate pulse pair passes along the delay line except in cases where it has been interfered with by pulses from another transmitter so as to make it useless. In the arrangement described in the above-mentioned Pierce application a pulse pair is accepted whenever the potentials at two properly spaced taps along a delay line to which the pulse train is applied are equal and opposite and have zero slope. This recognition circuit, however, is found to be subject both to the distortion characteristic of the more readily available differentiating circuits and to the timing uncertainty resulting when the gradual slope near the pulse crests is used as a criterion. The present arrangement utilizes basically four checking points along the line instead. Effectively, a delay line is utilized for a form of distortionless differentiation. Moreover, by operating on the steeply sloping sides of the pulses instead of on the gradual slopes of the crests, there is effected a higher degree of timing discrimination. Additionally, the present arrangement makes convenient the production of shorter pulses for operating the gate, thereby minimizing possible interference effects.

Figure 5:
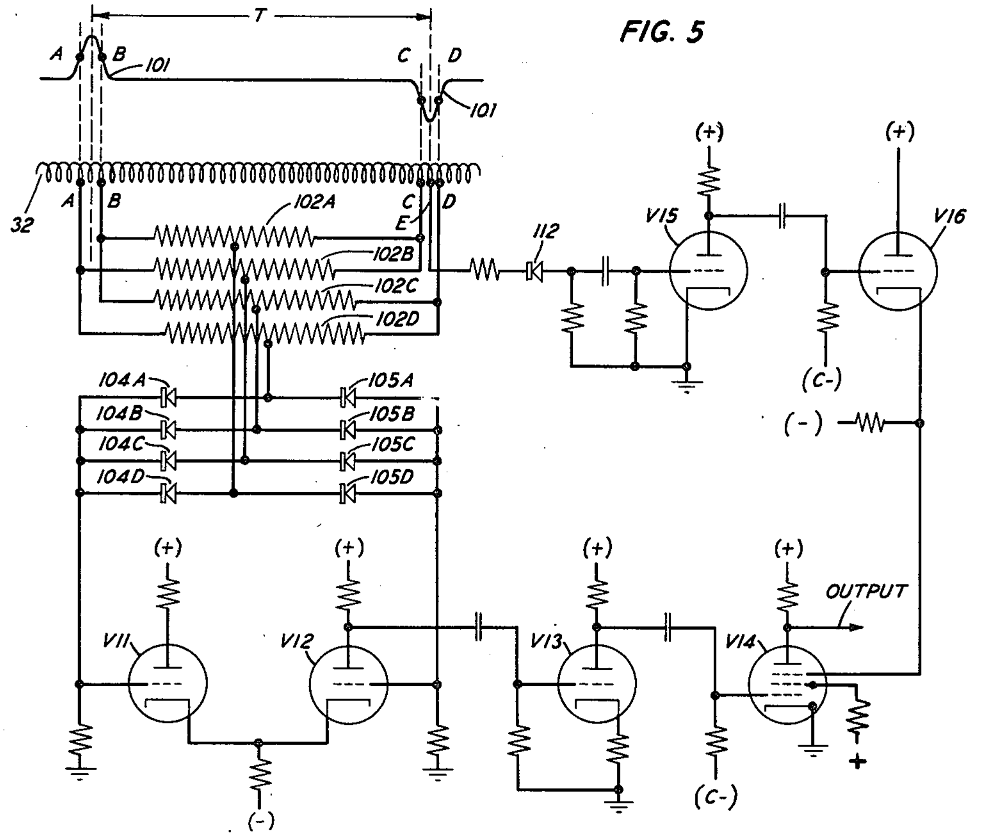
Fig. 5 shows diagrammatically an illustrative embodiment of a recognition circuit, in accordance with the invention, suitable for incorporation in the receiving terminal shown in Figs. 3 and 4.

Fig. 5 shows a recognition circuit, in accordance with the present invention, which is adapted for accepting selectively pulse groups of pulse pairs of the kind characterizing the transmitter of Fig. 1. The delay line 32 to which is applied the input pulse train is provided with four taps, A, B, C, and D, spaced so that the time necessary for a pulse to travel from A to C and from B to D equals the characteristic interpulse code interval T. Also, the separations of tap pairs A—B and C—D are chosen so that when the appropriate pulse pair is properly centered therebetween, as is illustrated by an appropriate pulse pair 101, the taps will correspond to points on the steeply sloping sides of the pulses.

Now let it be assumed that the pulse train has progressed along the delay line so that an appropriate pulse pair is disposed therealong as shown for the pulse pair 101. At this time the voltages at taps A, B, C, and D are related as follows:

$$V_A = V_B = -V_C = -V_D \qquad (1)$$

where the subscripts denote the particular tap. It is in accordance with the invention to provide an enabling pulse whenever these relationships are satisfied, except for the case when these voltages are all equal to zero.

To test for the satisfaction of these voltage relationships between the various taps, there are provided measuring networks therebetween. Suitable measuring networks, for example, are achieved by means of the resistance bridging elements 102A through 102D, one such element being bridged between taps of equal and opposite potential as determined by the relationships of Equation 1.

Satisfaction of the desired relationships can now be established by checking for zero voltage at the midpoints of these bridging networks. To this end, each of the midpoints of resistances 102A through 102D is connected as shown through a separate one of the four pairs of oppositely poled unilaterally conducting elements 104A through 104D and 105A through 105D, to control grids of tubes V11 and V12, which together form a differential amplifier similar to that at the transmitter.

At this point it can be appreciated that for any particular relative amplitude distribution of the two pulses of a pulse pair, there still are available a series of relationships corresponding to those defined by Equation 1 which establish the presence of an appropriate pulse pair in the delay line. In each case, satisfaction of these relationships may be established by checking at four similarly spaced taps by means of bridging networks, although in each case the particular zero point will depend on the relative amplitude distribution. Additionally, if the pulses of the pulse pair are not of opposite polarity, phase reversal of one can be provided in the bridging network. Moreover, it should be evident that one of the zero checking points is redundant, since there are essentially only three relationships which must be tested.

The differential amplifier is used to detect any unbalance existing at the various zero checking points. By means of the two oppositely poled sets of unilateral conducting elements and the push-pull arrangement of tubes V11 and V12, any unbalance at any of the checking points results in a positive voltage output at the output of tube V12. This positive voltage is inverted by the amplifier V13 and applied as a negative disabling pulse to the control grid of the mixer tube V14.

Figures 6A, 6B, 6C:
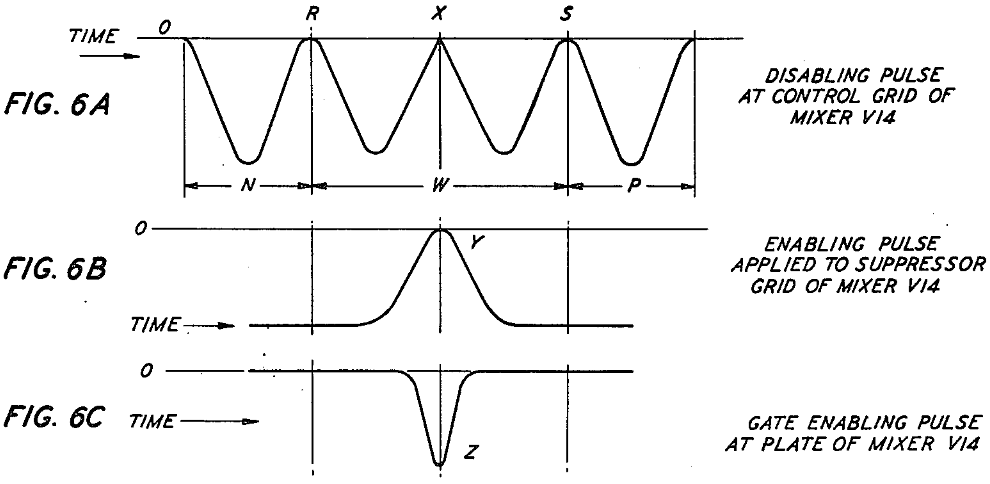
Figs. 6A through 6C illustrate wave forms which are helpful in the description of the recognition circuit of Fig. 5.

When an appropriate pulse pair travels along the delay line, the disabling pulse applied to the control grid of the mixer tube V14 is as shown in Fig. 6A. The zero output at X corresponds to the time when the two pulses of the pair are properly centered between the tap pairs of the delay line. At slightly earlier and later times there will be pulses N and P as shown. Pulse N is caused by the negative or leading pulse of the pair crossing taps A and B while pulse P is caused later as the positive or trailing pulse of the pair crosses taps C and D. The wave portion W intermediate the two spurious zeros R and S corresponds to the interval after the leading pulse has crossed tap B and before the trailing pulse has crossed tap C. Thus the zero at X in the W wave is a unique indication of the desired pulse pair. For pulse pairs in which the interpulse timing does not correspond to the code intertap delay there is no zero point such as shown at point X in the W wave.

To avoid a false indication when there are no pulse voltages present on any of the taps, as with points R and S of Fig. 6A, an enabling pulse which is combined with the disabling pulse train in the mixer tube V14 is derived from a fifth tap E positioned along the delay line intermediate between taps C and D. This pulse is applied through the unilateral conducting element 112 poled to pass only negative pulses to the pulse amplifier tube V15. Thereafter the positive voltage output derived from tube V15 is applied by way of the cathode follower V16, which acts as a low impedance source, to the suppressor grid of the mixer tube V14 and there acts as an enabling pulse permitting conduction by tube V14. This arrangement imposes still another check and makes it necessary that the two pulses of the pulse pair to be selected have a particular sequence, in this case that the leading pulse is negative as illustrated by pulse pair 101 of Fig. 5.

In Fig. 6B there is shown the wave from Y of the enabling pulse. It can be seen by comparison with Fig. 6A that the peak of the enabling pulse will occur at the time corresponding to zero point X of Fig. 6A but that no pulse will be applied to the suppressor of V14 at times corresponding to zero points R and S. It should be evident that it similarly would be possible to get a positive indication by tapping at some other appropriately chosen point, as one intermediate taps A and B, so long as the appropriate phase conditions are met on the suppressor grid of tube V14.

As a result both of the absence of a disabling pulse from the differential amplifier and of the presence of an enabling pulse derived from the intermediate tap E, a gating control pulse will be derived at the plate of the mixer tube V14 corresponding in time to the coincidence of the zero point X with the enabling pulse Y. In Fig. 6C the resultant output is shown as the pulse Z. This pulse is then applied to enable an otherwise blocked gating circuit while at the same time from two other taps a composite sample of the pulse group is being supplied as an input to this gating circuit.

In practice, jt is sometimes found desirable to introduce relative impedances at various points in the bridging networks to compensate for distortions which are apt to arise in transmission.

Now that there has been described in detail the operation of a typical recognition circuit, it appears desirable to describe the circuitry of an illustrative receiver, such as that shown in Fig. 4, which embodies such a recognition circuit, for use with a transmitter of the kind shown in Fig. 1. The pulse train which is transmitted through the medium common to many receivers is applied by way of the buffer amplifier 201 to a delay line 202 which is provided with five taps A through E spaced in accordance with the timing code characteristic of this particular receiver for supplying the recognition circuit 203 in the manner described above. It is found desirable in order to insure "all or nothing" action in the gating circuit to sharpen the gating control pulse shown as Z in Fig. 6C which is provided by the recognition circuit. To this end this pulse is applied by way of the pulse inverter V21 to trigger the conventional single shot multivibrator formed by tubes V22 and V23 and their associated circuitry. The multivibrator output is then differentiated by means of the differentiating network consisting of capacitance 205 and resistance 206 and applied to the control grid of the amplifier V25 which is biased to act as a clipper. There is then provided a negative pulse in the latter's plate circuit which includes the primary winding of the triple-wound transformer T4, the other two windings of which are in the gating circuit. This negative pulse enables the gating circuit and permits acceptance for its duration of the message samples applied at its input. For best signal-to-noise performance, it is found preferable to sample both pulses of a pulse pair and to combine the two samples. A sample of the leading or negative pulse is taken at tap F spaced so that the sample derived will be applied to the gating circuit at about the same time as the gating circuit is enabled. Additionally a sample of the trailing or positive pulse similarly is derived at tap G, and then applied to the phase invertor V24 so that the two samples can be combined in the same sense. The two samples are combined in the input circuit of cathode follower V26 whose output is applied as the gating circuit input. By staggering the two sampling taps F and G slightly with respect to the center points of the two pulses, a fairly flat-tapped pulse is available as the gating circuit input. This minimizes amplitude distortion resulting from slight timing irregularities in the gate enabling pulses. In a practical embodiment, the gating circuit is operated about one quarter of a microsecond each time a sample is taken. Accordingly, the resistance of the gating circuit needs to be very low in order to charge sufficiently the storage capacitor 211 in its output. Accordingly, in this preferred embodiment the gating circuit employed is of the kind known as a "double diode gate." The gating circuit comprises two paths from its input connection at the cathode of the cathode follower V26 to its output connection at the control grid of the amplifier V27. One such path includes the resistance-capacitance combination 212, 213, one secondary winding 217 of the transformer T4 shunted by a damping resistance 218 and the anode-cathode path of the diode V29. The other such path includes the resistance-capacitance combination 214, 215, the other secondary winding 221 of the transformer T4 shunted by its damping resistance 222 and the cathode-anode path of the diode V30. The two secondary windings 217 and 221 are oppositely wound, a negative gating pulse applied to the primary winding 209 in the anode circuit of amplifier V25 resulting in a positive pulse at the anode of V29 and a negative pulse at the cathode of V30. The parameters of the two paths are chosen so that during a gating interval when both paths conduct, producing a circulation current around the two paths, the voltage at the output connection follows only the voltage at the input connection. Accordingly, the gating circuit acts as a switch, when closed by a gating pulse acting to transmit signals from the cathode follower V26 to the input of the amplifier V27, and when open, as in the absence of a gating pulse, acting as a high impedance. As a result a pulse transmitted to the input of amplifier V27 when the switch is closed is held by the storage capacitance 211, in the input circuit of V27, until the succeeding sample is received. In this way, this condenser acts as an integrating network for providing a continuous input to the amplifier V27, the input value being changed by each succeeding pulse. The output of amplifier V27 is then applied to a low pass filter which eliminates the sampling frequency and provides a smooth output wave which is a facsimile of the original signal. This is then applied to the audio amplifier V28 whose output is available for utilization.

Figure 8:
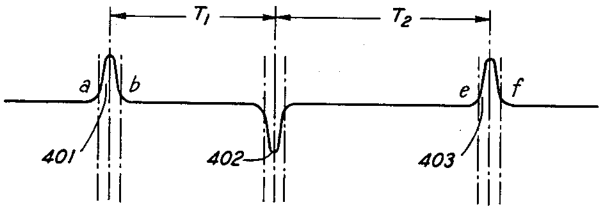
Fig. 8 illustrates the wave form of a ternary pulse group of the kind for use by the recognition circuit of Fig. 7.

As has been mentioned above, it may be desirable to transmit the message samples in pulse groups of three or more. In this case, the code still comprises (1) a fixed number of pulses in each group; (2) a particular amplitude and polarity relationship between the various pulses, and (3) a characteristic timing interval between the pulses of the group. Fig. 8 shows a pulse group comprising three pulses 401, 402, and 403, of which pulses 401 and 403 are equal to but of opposite polarity than pulse 402, and where $T_1$ is the code spacing between pulses 401 and 402, and $T_2$ the code spacing between pulses 402 and 403. It should be evident that this group can be recognized by the appropriate receiver consistent with the principles set forth above. For example, there can be provided two recognition circuits of the kind described, each adapted for pulse groups of pulse pairs. One can be set for a coding interval $T_1$ to provide a first gating control signal when pulses 401 and 402 are properly disposed along the line. Additionally the second recognizer circuit can be set up for a coding interval $T_2$ to provide a second gating control signal when pulses 402 and 403 are properly disposed. By mixing these two gating controls, there can be derived a single gating control pulse to provide an indication when pulses 401, 402, and 403 are all properly disposed along the delay line. Then from suitably spaced taps, samples of each of three pulses of the group can be applied in proper sequence as inputs to the gating circuit.

Figure 7:
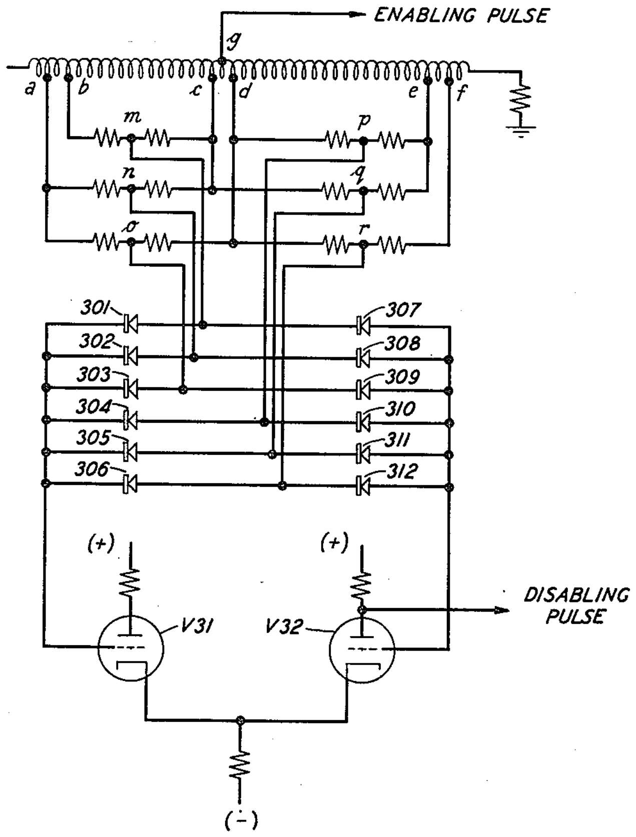
Fig. 7 shows a modification of the recognition circuit of Fig. 4, which is suitable for recognition of ternary pulse groups.

However, the same results may be achieved more directly by adapting a single recognizer for ternary pulse groups. Fig. 7 shows a recognizing circuit particularly suitable for accepting pulse groups of the kind shown in Fig. 8. The delay line is now provided with seven taps, *a* through *g*, taps *a* through *f* providing six checking points which are interconnected by bridging elements to provide a negative indication when the necessary amplitude relationships are not met for pulse group acceptance, and tap *g* providing a positive indication to discriminate against the case where the voltages at taps *a* through *f* are all zero. Taps *a* through *f* are spaced in accordance with the principles set forth above. The tap pair spacings *a*—*b*, *c*—*d*, and *e*—*f* being less than the widths of the corresponding pulses, and the mean separation between tap pairs *a*—*b* and *c*—*d* corresponding to the interpulse timing code interval $T_1$ and the mean separation between tap pairs *c*—*d* and *e*—*f*. By bridging elements there are derived six zero checking points *m* through *r*, which are connected through oppositely poled unilaterally conducting elements 301 through 312 as shown to the control grids of tubes V31 and V32 which together form a differential amplifier which provides a disabling pulse whenever there is an unbalance at any of the various zero checking points. Simultaneously there is derived from tap *g* when the desired conditions are met, an enabling pulse of a particular polarity which is mixed in the way described earlier in connection with Fig. 5 with the disabling pulse train from the differential amplifier to provide a gating control pulse.

From the foregoing, it should be evident that by further modifications, there can be obtained a recognition circuit suitable for even more involved pulse groups. For example, if the amplitudes of the various pulses of the group are made unequal, compensation may be had simply by adjustment of the zero checking point in the bridging paths. Moreover, for the accommodation of larger pulse groups, it is only necessary to increase the number of tap pairs and checking points.

Moreover, it is to be understood that the particular arrangements described are merely illustrative of the principles of the invention. Various modifications in the particular circuitry employed can be made by a worker skilled in the electronic circuit art without departing from the spirit and scope of the invention.

What is claimed is:

1. Apparatus for selectively accepting sequential pulse groups from a pulse train, each pulse group to be selected characterized by a predetermined number of pulses having a designated interpulse spacing and a particular relative amplitude distribution, comprising a delay line supplied with said pulse train, a plurality of tap pairs along said delay line, one tap pair corresponding to each pulse of the pulse group, the time spacing between the two taps of each pair being less than the duration of the corresponding pulse, the mean time spacing between successive tap pairs corresponding to the interpulse spacing between successively corresponding pulses of the group, a plurality of voltage sensitive networks, each interconnecting different combinations of two taps and responsive to voltage unbalances, and utilization means controlled by the outputs from said voltage sensitive networks and actuated when an appropriate pulse group is properly disposed along the delay line.

2. Apparatus for selectively accepting sequential pulse groups from a pulse train, each pulse group to be selected characterized by a predetermined number of pulses having a designated interpulse spacing and a particular relative amplitude distribution, comprising a delay line supplied with said pulse train, a plurality of tap pairs along said delay line, one tap pair corresponding to each pulse of the pulse group, the time spacing between the two taps of every pair being less than the duration of the corresponding pulse, the mean time spacing between successive tap pairs corresponding to the interpulse spacing between successive pulses of the group, a plurality of bridging networks interconnecting different combinations of two taps, voltage unbalance sensitive means connected to each bridging network at an intermediate point and gating means controlled by the voltage unbalance sensitive means output when an appropriate pulse group is properly disposed along the delay line.

3. Apparatus for selectively accepting sequential pulse groups from a pulse train, each pulse group to be selected characterized by a predetermined number of pulses having a designated interpulse spacing and a particular relative amplitude distribution, comprising a delay line supplied with said pulse train, a plurality of tap pairs along said delay line, one tap pair for each pulse of the pulse group, the time spacing between the two taps of each pair being less than the duration of the corresponding pulse, the mean timing spacing between successive tap pairs corresponding to the interpulse time interval between successive pulses of the group, a plurality of bridging networks, each interconnecting two taps of different pairs, voltage sensitive means connected in each bridging network at a point related to the relative amplitude distribution of the two pulses corresponding to the two taps interconnected, and a gating circuit controlled by the various voltage sensitive means for accepting the desired pulse groups.

4. Apparatus for selectively accepting sequential pulse groups including pulse pairs from a pulse train, the pulses of each pair having a preassigned relative amplitude distribution and being separated by a particular interpulse time interval, comprising a delay line, two tap pairs along said line, the two taps of each pair being separated by a time space less than the duration of the pulses of the pulse pairs and the mean time spacing between the two pulse pairs being equal to the particular interpulse timing interval, bridging networks interconnecting different combinations of two taps, voltage sensitive means connected to each bridging network at a point related to the relative amplitude distribution of the pulses of the pulse pair, and gating means controlled by said voltage sensitive means for accepting the desired pulse pairs.

5. Apparatus for selectively accepting sequential pulse pairs from a pulse train, the two pulses of each pair being of equal amplitude and opposite polarity and being separated by a preassigned interpulse time interval, comprising a delay line supplied with said pulse train, a first, a second, a third, and a fourth tap along said delay line, the timing spacings between the first and second and the third and fourth taps being less than the duration of said pulses, the time spacings between the first and the third and the second and the fourth taps each corresponding to the interpulse time interval, voltage sensitive networks responsive to the average voltage between said first and third, first and fourth, second and third and second and fourth taps for providing an enabling pulse when each of these average potentials is at a designated value, and a gating circuit normally closed which is energized by said enabling pulse.

6. A recognizer circuit for selectively accepting sequential pulse groups from a pulse train, each pulse group to be selected characterized by a predetermined number of pulses having a designated interpulse spacing and a particular relative amplitude distribution, comprising a delay line supplied with said pulse train, a plurality of tap pairs along said delay line, one tap pair corresponding to each pulse of the pulse group, the time spacing between the two taps of each pair being less than the duration of the corresponding pulse, the mean time spacing between successive tap pairs corresponding to the inter-pulse spacing between successively corresponding pulses of the group, and a plurality of voltage sensitive means, each means connected between different taps along said delay line, for providing a voltage null responsive to a predetermined relationship between the voltage amplitudes on said taps.

7. In a pulse-group recognizer system, a source of a train of groups of pulses, each group being amplitude variable above a minimum level, and each pulse separated from an adjacent pulse in its group by a respective characteristic time spacing, a delay line along which are connected pairs of voltage taps, each pair corresponding to its respective pulse in the group to be recognized, the time spacing between taps of each pair being less than the duration of the pulse respective to the pair and the mean time spacing between adjacent pairs of taps corresponding to the characteristic time spacing between the pulses respective to the pairs, and enabling-disabling means connected to said delay line by means including said tap pairs and responsive only to a desired pulse-group properly disposed along said delay line.

References Cited in the file of this patent

UNITED STATES PATENTS

| | | |
|---|---|---|
| 2,522,609 | Gloess | Sept. 19, 1950 |
| 2,535,303 | Lewis | Dec. 26, 1950 |
| 2,570,716 | Rochester | Oct. 9, 1951 |
| 2,577,015 | Johnson | Dec. 4, 1951 |